(Model.)

J. J. COWELL.
MACHINE FOR EDGING AND SEAMING TIN ROOFING.

No. 332,643. Patented Dec. 15, 1885.

Witnesses.
C. Bendixon
F. H. Gibbs

Inventor.
Julius J. Cowell
per Dodd, Lassit Hey
Attys (Model.)

6 Sheets—Sheet 2.

J. J. COWELL.
MACHINE FOR EDGING AND SEAMING TIN ROOFING.

No. 332,643. Patented Dec. 15, 1885.

(Model.)

J. J. COWELL.

MACHINE FOR EDGING AND SEAMING TIN ROOFING.

No. 332,643. Patented Dec. 15, 1885.

(Model.)
J. J. COWELL.
MACHINE FOR EDGING AND SEAMING TIN ROOFING.
No. 332,643. Patented Dec. 15, 1885.
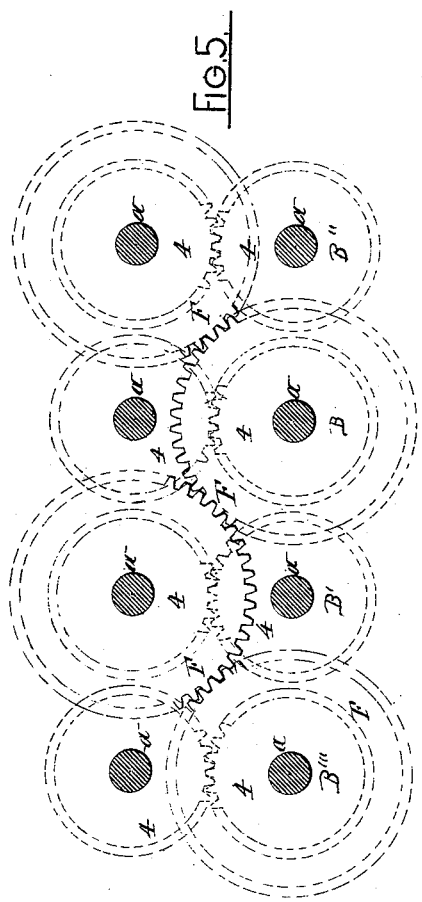
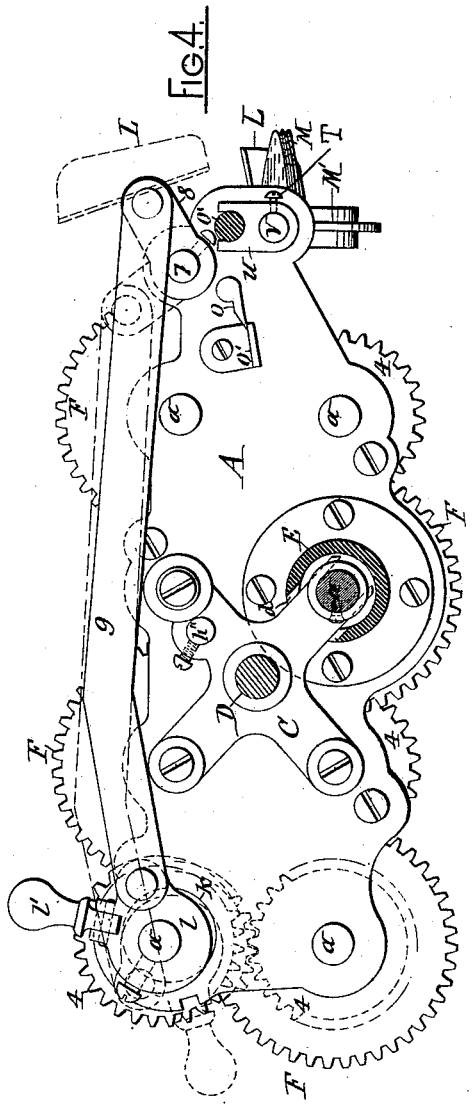

(Model.) 6 Sheets—Sheet 5.
J. J. COWELL.
MACHINE FOR EDGING AND SEAMING TIN ROOFING.
No. 332,643. Patented Dec. 15, 1885.
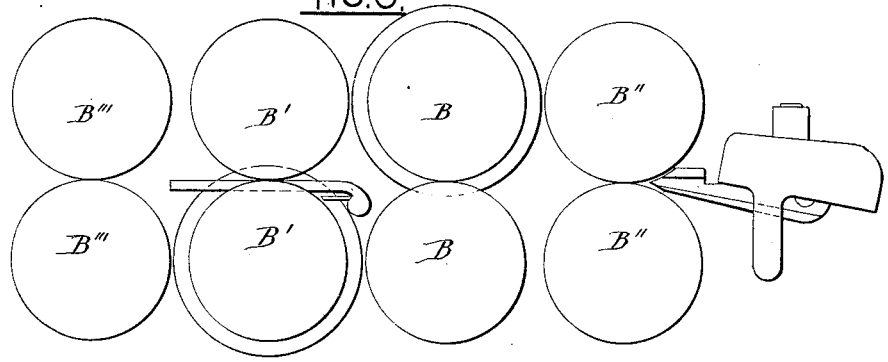
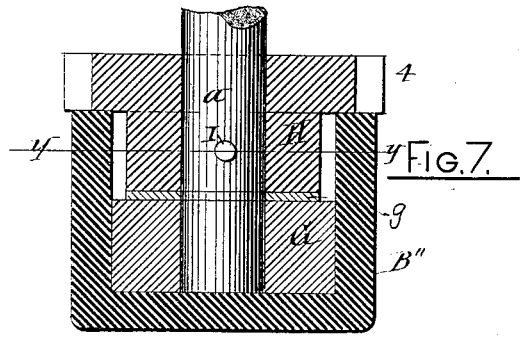
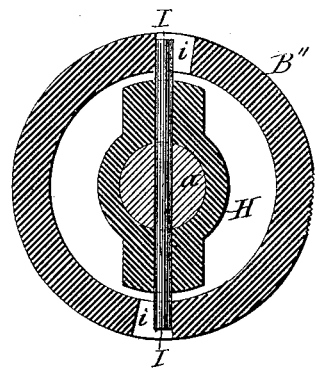

(Model.)
J. J. COWELL.
MACHINE FOR EDGING AND SEAMING TIN ROOFING.
No. 332,643. Patented Dec. 15, 1885.
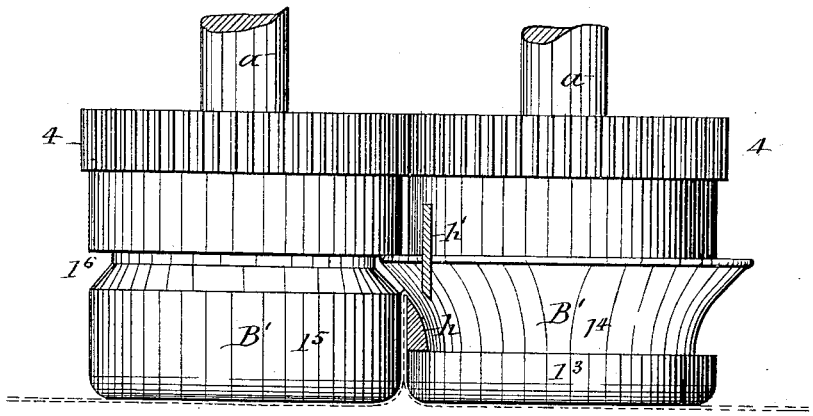
Fig. 8.
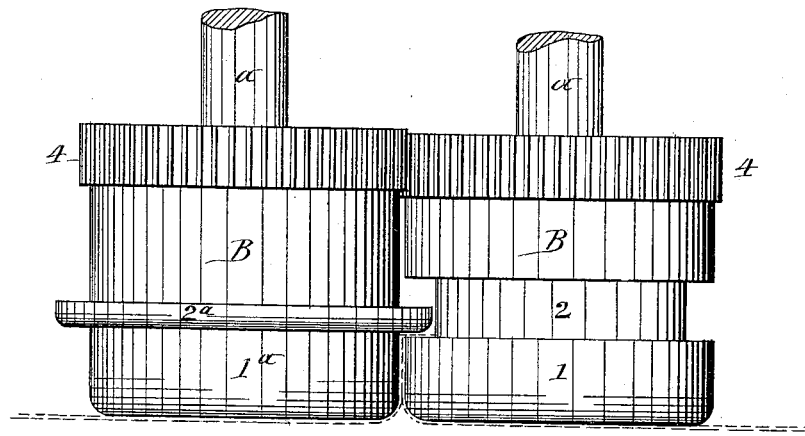
Fig. 9.
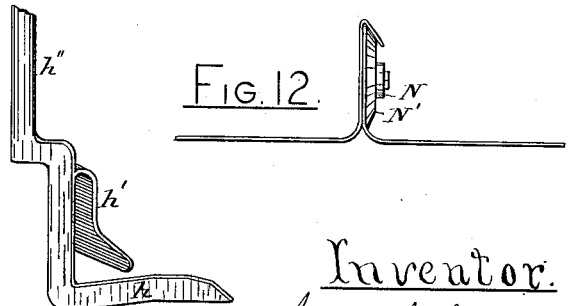
Fig. 12.
Fig. 13.
Witnesses.
Inventor.

UNITED STATES PATENT OFFICE.

JULIUS J. COWELL, OF WEEDSPORT, NEW YORK, ASSIGNOR OF ONE-HALF TO SYLVESTER W. YOUNG, OF SAME PLACE.

MACHINE FOR EDGING AND SEAMING TIN ROOFING.

SPECIFICATION forming part of Letters Patent No. 332,643, dated December 15, 1885.

Application filed July 22, 1885. Serial No. 172,274. (Model.)

*To all whom it may concern:*

Be it known that I, JULIUS J. COWELL, of Weedsport, in the county of Cayuga, in the State of New York, have invented new and useful Improvements in Machines for Edging and Seaming Tin Roofing, of which the following, taken in connection with the accompanying drawings, is a full, clear, and exact description.

This invention consists in a novel construction and organization of mechanisms constituting an efficient and convenient machine, by means of which tin roofing can be expeditiously and accurately flanged and folded at the edges of the flanges, so as to form the so-called "standing-lock" on the seams, of the tin roofing, the construction and combination of the constituent parts of the machine and their operation being more fully hereinafter described, and pointed out in the claims.

Figure 1:
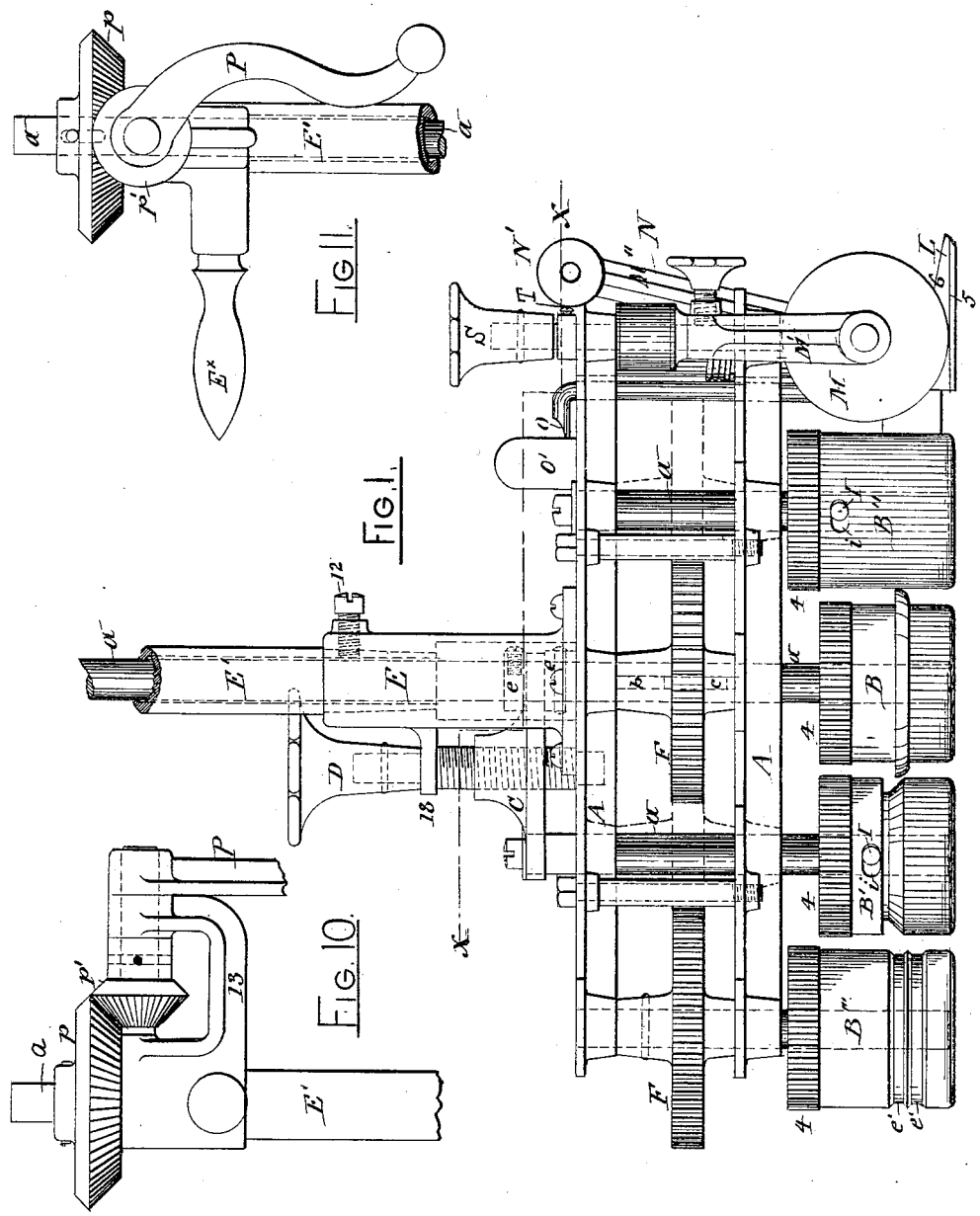
Figure 2:
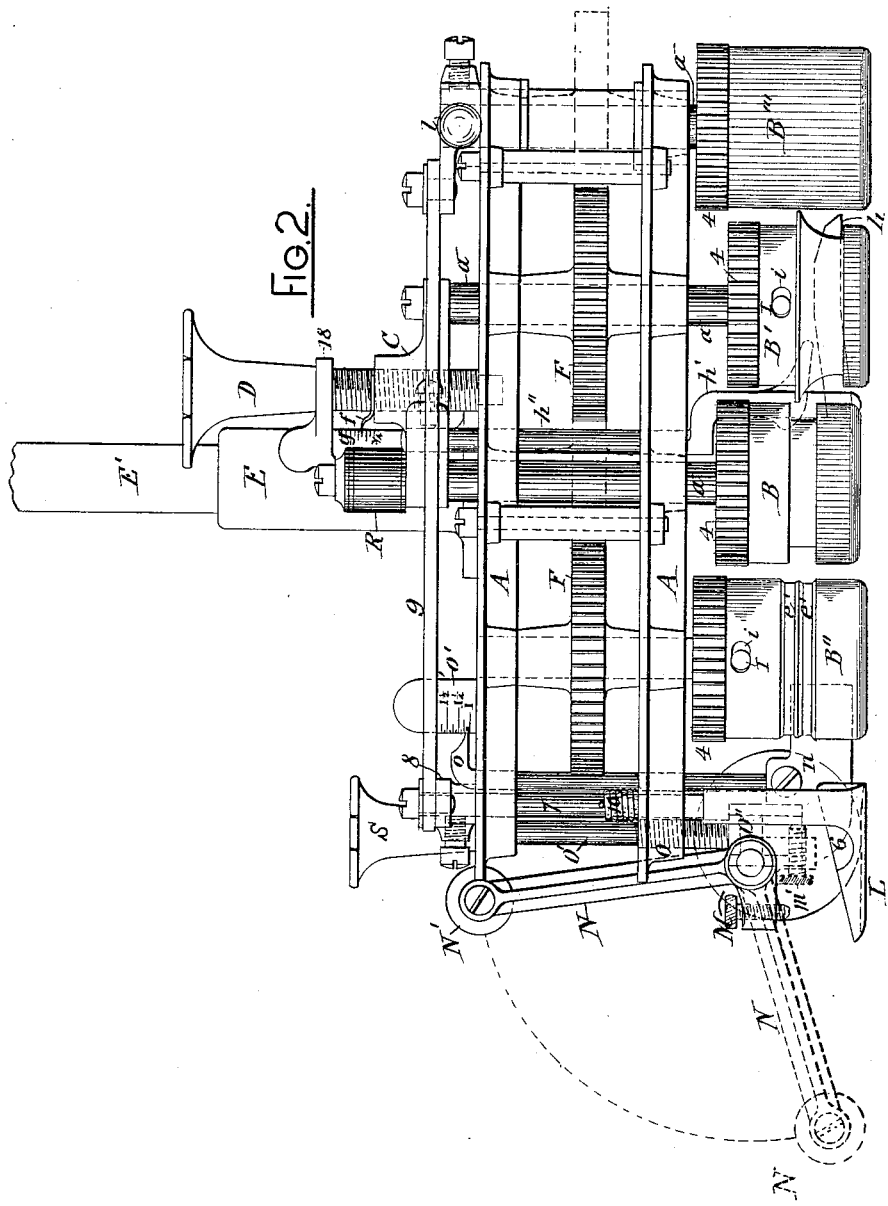
Figure 3:
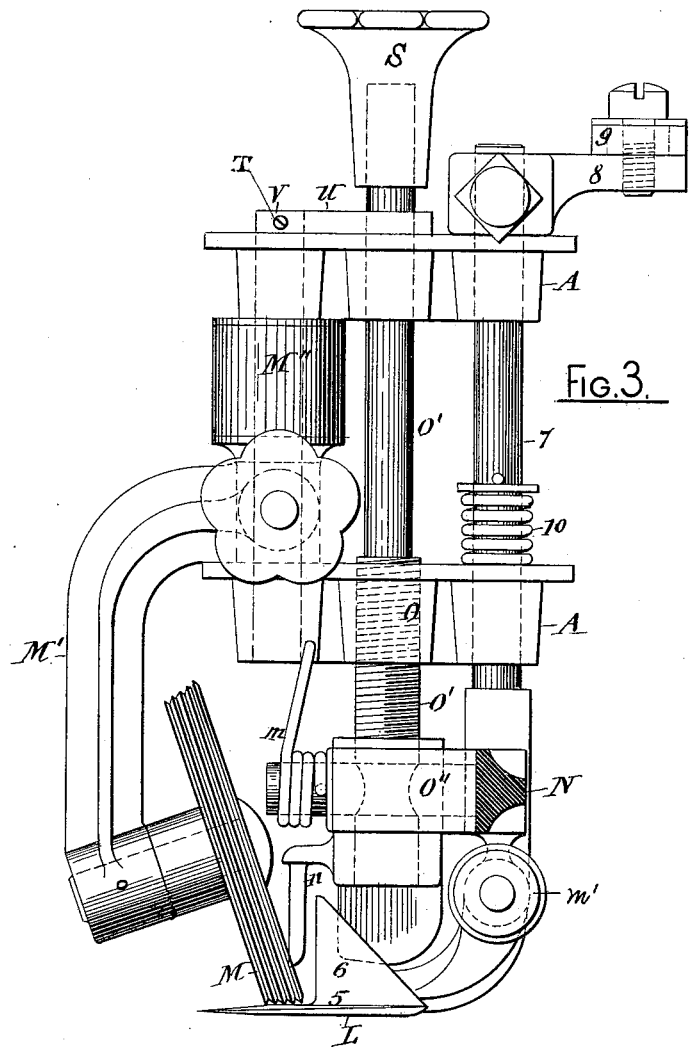

In the accompanying drawings, Figures 1 and 2 are elevations of my machine, taken at opposite sides thereof. Fig. 3 is a front end view, the forward projecting arm which carries the roller for guiding the edge of the narrower flange under the fold of the wider flange being broken away to better illustrate other important parts of the machine. Fig. 4 is a plan view taken on the line $xx$, Fig. 1. Fig. 5 is a horizontal sectional view illustrating the train of gearing for transmitting synchronous movement to the flanging, folding, and compressing rollers of the machine. Fig. 6 is an inverted plan view of the aforesaid rollers in their relative positions, and the gages used in connection therewith. Fig. 7 is an enlarged vertical transverse section of one of said rollers. Fig. 7$^a$ is a horizontal transverse section on line $yy$, Fig. 7. Figs. 8 and 9 are enlarged views of the sets of folding-rollers, illustrating their operation. Figs. 10 and 11 are detached views of the upper end of the driving-shaft and devices connected therewith, taken from two sides at right angles to each other. Fig. 13 is a detached view of the shoe employed in connection with the folding-rollers, and Fig. 12 is a detached end view showing the operation of the roller employed for guiding the edge of the narrower flange under the fold of the wider flange.

Similar letters of reference indicate corresponding parts.

A represents the frame of the machine, consisting of two horizontal plates sustained a proper distance apart by tubular posts interposed between said plates and firmly secured together by bolts passing through said plates and posts. Underneath the said frame are arranged first a set of flanging-rollers, B'', at the front portion of the frame, then two sets of folding-rollers, B B', and then a set of compressing-rollers, B''', at or near the rear end of the frame. The rollers of each of said sets are disposed at opposite sides of the longitudinal central line of the frame, as represented in Fig. 6 of the drawings. The shafts $a$ of the said rollers extend vertically through the frame A and are journaled therein. To the shafts of each set of rollers are attached a set of gears, 4 4, which mesh in each other and are of equal diameters, so as to cause the rollers at one side of the machine to rotate synchronously at the same speed and in opposite direction from those of the opposite side of the machine. Between the two plates of the frame A are four gear-wheels, F F F F, one on one of the shafts of each set of rollers and meshing successively one with the other, as illustrated in Fig. 5 of the drawings; hence the rotation of one of the gears F imparts motion to all of the aforesaid flanging, folding, and compressing rollers B B' B'' B'''. The shaft $a$ of one of the folding-rollers, B, is extended above the frame, and is sustained by a tubular standard composed of a stout bottom section, E, bolted to the top of the frame A, and the tube E' screwed into the upper end of the section E, and further secured by a set-screw, 12, as shown in Fig. 1 of the drawings. The shaft $a$ is extended through said standard, and constitutes the driving-shaft of the machine. On the upper end of the shaft is a bevel-gear, $p$, connected therewith by a pin passing through the hub of said gear and through a vertical slot in the shaft, so as to compel the shaft to rotate with the gear and to allow said shaft to move vertically without disturbing the gear from its plane, for the purpose hereinafter explained. On an arm, 13, affixed to and projecting laterally from the upper end of the shaft, is journaled a horizontal shaft, to which is attached a bevel-pinion, $p'$, which meshes in the gear $p$. By means of a crank, P, attached to the end of the aforesaid horizontal shaft, rotary motion is imparted to the driving-shaft $a$, and this motion is transmitted to the rollers B B' B'' B''' by means of the train of gears F and 4, hereinbefore described.

For the purpose of adjusting the folding-rollers B and B' in their elevation from the base of the machine, according to the height of the standing-seam to be formed on the tin, I arrange the shafts $a$ of said rollers movable vertically on the frame A and support them by a yoke, C, having four arms embracing, respectively, the four shafts of the aforesaid rollers, which shafts are shouldered above and below the arms of the yoke, so that by raising and lowering the latter said shafts $aa$, with their rollers B B', are raised and lowered correspondingly. The connection of the yoke C with the driving-shaft $a$ is effected by providing the standard-section E with a side aperture, $d$, through which the arm of the yoke C is extended to embrace the driving-shaft, as illustrated in Fig. 4 of the drawings.

The collars $e\ e$, which are attached to the shaft above and below the yoke-arm, are represented by dotted lines in Fig. 1 of the drawings. An adjusting-screw, D, passes vertically through a screw-threaded eye in the center of the yoke C, and has its lower end stepped in the top of the frame A, its upper end being sustained in an arm, 18, which projects from the side of the standard-section E. By turning said screw the yoke C is raised or lowered to carry the folding-rollers B B' toward or from the base of the machine, according to the height of the standing-seam to be formed on the tin. A graduated scale, $g$, is attached to the side of the standard-section E, and an indicator or pointer, $f$, is affixed to the yoke C, to indicate the position to which the rollers B B' are set by the adjusting-screw.

In order to permit of the aforesaid adjustment of the rollers without disturbing the gears F F, I provide the shaft $a$ with a longitudinal groove, $b$, and the gear F with a spline or feather, $c$. The hub of the gear, abutting against the two horizontal plates of the frame A, confines said gear vertically. One of the forward folding-rollers, B, is arranged so as to yield vertically by a rubber or spring cushion, R, interposed between the yoke and the collar on the shaft $a$ of said roller. This cushion sustains the roller slightly higher than the other rollers, so as to allow it to easily travel over the cross-seams of the tin, the roller having a tendency to draw down when at work on the flange of the tin, and the cushion R, yielding to said tendency, allows the roller to follow closely the horizontal portion of the tin.

One of the first set of folding-rollers is formed with a finely corrugated or serrated lower section, 1, and with a circumferential groove, 2, above the section 1, said groove being of rectangular form in cross-section. The companion roller B is formed with a similar corrugated or serrated lower section, $1^a$, and a circumferential flange, $2^a$, above the section $1^a$, the bottom edge of said flange being slightly rounded, as shown in Fig. 9 of the drawings. The flange $2^a$ projects into the groove 2, and in passing between the said rollers the vertical flange of the tin previously formed thereon, as hereinafter described, (the upper edge of said flange,) is bent over at a right angle by the impingement of the flange and adjacent shoulder of the groove 2, as represented by dotted lines in Fig. 9 of the drawings. The succeeding set of folding-rollers B' are designed to further bend down the aforesaid bent portion of the flange, one of said rollers being formed with a finely corrugated or serrated lower section, $l^3$, which is considerably narrower than that of the roller B, and above this section is a circumferential groove, $l^4$, which is made flaring from its base upward, as shown in Fig. 8 of the drawings.

The companion roller is formed with a serrated lower section, $l^5$, which is considerably wider than that of the other roller, B', and above this lower section is a circumferential groove, $l^6$, in which runs a circumferential projection formed at the top of the groove $l^4$ by the flare thereof. The flare of said groove bends down the edge of the tin, as represented by dotted lines in Fig. 8 of the drawings.

In order to guard against the complete folding and wrinkling of the turned-down edge of the tin, I arrange between the rollers B' B' a shoe consisting of a bar, which in cross-section is similar to but somewhat smaller than the aperture between the two rollers at the groove $l^4$, through which aperture said bar is extended. The edge of the tin being folded over the top edge of said shoe prevents the fold of the tin from being completely closed. A guard, $h'$, attached to the shoe $h$, and bearing on the exterior of the fold of the tin prevents the latter from being bent out too far. To the guard $h'$ is attached an upright arm, $h''$, which passes loosely through the frame A, and is firmly secured to the yoke C, so as to be adjusted simultaneously with the folding-rollers B B'.

B''' B''' designate the compressing-rollers, pivoted to the rear portion of the frame and respectively at opposite sides of the longitudinal central line of the frame. These rollers are also finely corrugated or serrated on their peripheries, for the purpose of affording to them a secure hold on the tin.

The machine being designed to flange the tin in one operation and subsequently to form the seam on said flanges, it becomes necessary to make the compressing-rollers adjustable in their position, and for that purpose I employ for the support of one of the rollers an eccentric journal-box, $k$, which is pivoted in the frame A and has journaled in it the shaft of said roller, as shown in Fig. 4 of the drawings.

To the journal-box $k$ is attached a collar, $l$, and to the latter is connected the lever $l'$. By means of said lever the eccentric journal-box can be turned so as to carry the roller B''', which is journaled in said box, toward or from its companion roller. Said rollers are to be separated from each other during the operation of forming the vertical flanges on the tin, as hereinafter described, and are to be brought in proximity to each other, so as to bring their gears 4 into engagement with each other, and thereby impart synchronous rotary motion to said rollers during the operation of forming the seam on the aforesaid flanges of the tin, which latter is effected by the pressure of the rollers B''' on the edge of the tin bent down by the folding-rollers B', as hereinbefore described.

To the forward end of the frame A are pivoted the flanging-rollers B'', arranged, respectively, at opposite sides of the longitudinal center line of said frame, the peripheries of said rollers being finely corrugated or serrated, for the purpose of obtaining a secure hold on the tin. In front of the said flanging-rollers is arranged a guide, L, composed of a horizontal plate, 5, carried on a level with the base of the machine, and provided with an upwardly-curved side flange, 6. Said guide is attached to the lower end of the shaft 7, which is pivoted on the frame A and supported yieldingly endwise by a spring, 10, surrounding said shaft, and pressing with its lower end on the frame and with its upper end on a pin projecting from said shaft, said spring serving to normally hold the guide L up toward the roller M, hereinafter described, and also to raise said guide slightly above the plane of the bottom of the machine during the operation of forming the seam on the tin, in which operation the guide L is turned to one side of the machine and made to slide over the tin. To the upper end of the shaft 7 is secured a horizontal lever, 8, by means of which lever the aforesaid shaft can be turned so as to carry the guide either directly in front of the rollers B'' or laterally away out of said position, as illustrated by full lines and dotted lines, respectively, in Fig. 4 of the drawings.

Since the aforesaid guide is employed only during the operation of flanging the tin, I connect the lever 8 with the collar $l$, hereinbefore referred to, by a strap, 9, so that by turning the aforesaid collar in carrying the compressing-roller B''' toward and from its companion roller the guide L is carried simultaneously from and to its position in front of the flanging-rollers, as illustrated in Fig. 4 of the drawings.

M is a roller sustained edgewise, and arranged to yield vertically in front of the flanging-rollers B'' by means of an arm, M', suspended from and clamped on the shaft V, which is extended vertically through the frame A, and is prevented from rotating by a locking-arm, U, adjustably attached to the shaft V by a set-screw, T, passing through the arm and engaging the shaft The free end of the said arm is bifurcated and embraces the upper end of the adjacent shaft O', and thus confines the shaft V from rotation. By loosening the arm U on the shaft V the latter, together with the arm M', can be turned so as to carry the roller M toward or from a line parallel with the longitudinal central line of the machine, as may become necessary to properly guide the tin to the machine, and by tightening the set-screw T the roller M is retained in its adjusted position. A rubber cushion or spring, M'', is interposed between the upper end portion of the arm M' and upper plate of the frame A, to afford a vertical movement to said arm, said movement being necessary to allow the roller M to traverse the cross-seams of the tin.

O' is a vertical screw-threaded shaft extended through a correspondingly-screw-threaded socket, O, attached to the front end of the frame A. To the lower end of said shaft is loosely attached a collar, O'', on the front portion of which is hinged an arm, N, which swings vertically thereon. By means of a spring, $m$, connected with the pivoted end of the arm N, and bearing with one of its ends on the frame A, the aforesaid arm is held normally in an elevated position, as represented by full lines in Fig. 2 of the drawings. A set-screw, $m'$, connected with the arm N, and arranged to collide with the collar on which said arm is hinged, constitutes an adjustable stop for arresting the downward movement of the said arm. On the free end of the arm is pivoted a vertical roller, N', which has a beveled edge, for the purpose hereinafter explained. To the aforesaid collar O'' is rigidly attached a gage, $n$, which projects rearward from the collar. From said gage projects vertically through the frame A a rod formed at its upper end into the shape of a pointer or indicator, $o$, and at the side of this indicator is a graduated scale, $o'$, secured to the top of the frame A. By means of a suitable handle attached to the upper end of the screw-threaded shaft O' said shaft can be turned, and thus caused to move toward and from the base of the machine, and thus carry the arm N, with its roller N' and the gage $n$, a greater or less distance from the base of the machine, the aforesaid indicator and scale serving to indicate the aforesaid position of the roller N' and gage $n$ in relation to the base of the machine.

In order to allow the described flanging, folding, and compressing rollers B B' B'' B''' to yield laterally and conform to the increased thicknesses of tin at the cross-seams thereof, I construct said rollers as follows: The roller proper consists of a hollow cylindrical shell, into which I place an annular rubber cushion or bush, G, which surrounds the shaft $a$. Over this bush I place a thin washer, $g$, and over the latter I place the hub H of the gear 4, which lies upon the roller, the hub being provided with an eye, through which the shaft $a$ passes. The hub is secured to the shaft by means of a pin, I, passing transversely through the same and through horizontally-elongated eyes $i\ i$ in the sides of the roller, as best seen in Fig. 7ª of the drawings. The elongation of the eyes $i\ i$ allows sufficient play to the pin I to afford the necessary lateral play to the roller when subjected to lateral strain.

The operation of the described machine is as follows: For turning up or flanging the edges of the tin, the guide L is set to project from the front of the machine and under the roller M, as represented by full lines in Fig. 4 of the drawings. By swinging the lever $l'$ of the collar $l$ forward, said collar being thereby turned on its axis, the strap 9 connecting said collar with the lever 8 on the shaft of the guide L, causes said shaft to turn correspondingly and carry the guide L into the aforesaid position in front of the machine. In turning the collar $l$ as aforesaid the eccentric journal-box $k$, attached thereto, turns with it, and thereby throws the roller B''', which is journaled in said box away from its companion roller, and thus prevents said rollers from impinging on the flanges of the tin as it emerges from the machine. In order to control the height of the flange to be turned up, the gage $n$ is first set about one inch from the base of the machine. The machine is then ready for the operation of flanging or turning up the edges of the tin, preparatory to forming the seam thereon. Before introducing the tin into the machine the corner of the tin at which the flanging is to begin is to be bent up sufficiently to allow the tin to be inserted between the roller M and guide L, the main portion of the tin being held horizontal, to allow the machine to travel over it, and the upturned corner of the tin is placed against the vertical flange 6 of the guide L and made to abut with its top edge against the gage $n$, and in this condition it is entered between the rollers B''. Then, by turning the crank P, rotary motion is imparted to all the rollers B B' B'' B''', with the exception of one of the rollers, B''', which is thrown out of gear by the turning of the eccentric journal-box, as before stated. The impingement of the serrated portions of the rotating rollers on the upturned portion of the tin propels the machine, which slides easily on top of the main portion of the tin. A suitable handle, E×, is arranged at the upper end of the standard E, as shown in Fig. 11 of the drawings, for steadying the machine in its movement by one hand while turning the crank P by the other hand. In said movement of the machine the lower portions of the rollers B'' turn up the edge of the tin at right angles to the plane of the main portion thereof and to the height permitted by the gage $n$. When the flanging of one edge of the tin is completed, as aforesaid, the machine is set for flanging the opposite edge of the tin. To do this the gage $n$ is raised about one-quarter of an inch, more or less, according to the width of the seam to be formed above its former position, and the folding-rollers B B', together with the shoe $h\ h'$, are by means of the adjusting-screw D set at a proper elevation from the base of the machine, so as to cause the grooved and flanged portions of the said rollers to bend downward the top edge of the wider flange formed on the tin, the operation of the folding-rollers being illustrated by dotted lines in Figs. 8 and 9 of the drawings. This wider flange is formed on the tin by introducing the edge of the tin between the roller M and guide L and thence between the flanging-rollers B'', and turning the crank P in the same manner as in the operation of forming the narrower flange, hereinbefore described. After the flange leaves the flanging-rollers the folding-rollers B B' bend the top edge of the flange down over the shoe $h$, which, with the guard $h'$, leaves the bent portion of the flange in the condition shown in Fig. 12 of the drawings. Then the two sheets of tin to be joined are placed in their requisite position on the roof, with the top portion of the narrow flange of one sheet under the turned-down portion of the wider flange of the other sheet, as represented in Fig. 12 of the drawings. Then the gage $n$ and folding-rollers B B' are lowered about one-quarter of an inch, or less. The guide L is swung to one side by means of the lever $l'$, which at the same time carries the compressing-roller B''' close to the side of its companion roller and throws it in gear with the same. Then the machine is placed to face the ends of the sheets of tin to be joined and moved up to it to enter the two flanges conjointly between the rollers B'', and the arm N is depressed to carry the edge of the roller N' under the folded edge of the wider flange at the side of the narrower flange, as shown in Fig. 12 of the drawings, thereby guiding said narrower flange under the fold of the wider flange. Then, by turning the crank P, the machine is propelled over the tin by the impingement of the serrated portion of the revolving rollers on the flanges of the tin. In said movement the flanging-rollers B'' press the bent edge of the wider flange closely against the side of the narrower flange, and the lowered folding-rollers B B' bend over and downward the aforesaid folded portion of the wider flange, together with the inclosed portion of the narrower flange, and the second folded portion is compressed by the rollers B''', thus forming the so-called "double seam" on the flanges of the tin.

It will be observed that by retaining the folding-rollers at the same elevation in the last operation as in the second operation the second folding of the tin is prevented, and thus a single seam as well as a double seam of any desired height can be formed by my machine.

The left-hand folding-roller B'' and the right hand compressing-roller B''', I provide each with circumferential grooves $e'\ e'$, and their companion rollers are maintained cylindrical or straight vertically. The grooves $e'\ e'$ prevent excessive compression of the fold of the tin, and those of the right-hand compressing-roller allow the double seam of the tin to be pressed to one side, so as to cause said seam to stand central over the adjacent vertical flanges of the tin, and thus effectually close the bottom of the seam without subjecting the seam to undue compression, and also to produce a more workmanlike finish.

Having described my invention, what I claim as new, and desire to secure by Letters Patent, is—

1. A machine for flanging and seaming tin roofing, comprising a frame, flanging, folding, and compressing rollers journaled in said frame and arranged in sets, and with the rollers of each set, respectively, at opposite sides of the longitudinal central line of the machine, a train of gearing for transmitting synchronous movement to the aforesaid rollers, and a main driving-shaft connected to one of said gears, substantially as set forth.

2. In combination with the frame A, the folding-rollers B B', having their shafts journaled in said frame and movable vertically thereon, the yoke C, connected with said shafts, and the adjusting-screw D, arranged to sustain the yoke at different elevations on the frame, substantially as and for the purpose set forth.

3. In combination with the frame A, the vertically-journaled rollers B, one of them being sustained so as to yield vertically on said frame, to conform to the increased thickness of tin at the cross-seams thereof, as set forth.

4. In combination with the frame A, the tubular standard E E', secured to said frame, the driving-shaft $a$, arranged to be movable vertically in said standard, and provided with the groove $b$, the folding-rollers B, one of them being fixed to said shaft, the gear F, confined vertically on the frame, and connected with the shaft by a spline or feather, $c$, sliding in the groove $b$, all constructed and combined to allow the roller B and its shaft to rise and fall without interfering with the gear F, substantially as set forth.

5. In combination with the frame A, the tubular standard E E', secured to said frame and provided with the aperture $d$, the driving-shaft $a$, arranged to be movable vertically in said standard, the folding-rollers B, one of them being fixed to the lower end of the shaft $a$, collars $e$ $e$, attached to said shaft, the yoke C, embracing the shaft between the collars thereof, and the adjusting-screw D, arranged to support the yoke, substantially as described and shown.

6. In combination with the frame A, standard E E', driving-shaft $a$, rollers B, one of them being fixed to said shaft, yoke C, supporting the shaft $a$, and the adjusting-screw D, supporting the yoke, as described, the scale $g$, attached to the standard, and the indicator $f$, attached to the yoke, substantially as described and shown.

7. In combination with the folding-rollers B', the shoe $h$, arranged between said rollers, to enter into the fold of the tin and prevent the complete closing of the fold, substantially as described and shown.

8. In combination with the folding-rollers B', the shoe $h$, arranged between said rollers, to enter into the fold of the tin, and the guard $h'$, carried at the side of the shoe, substantially as and for the purpose specified.

9. The combination, with the shaft $a$, of the roller B, formed with a concentric cavity around the shaft and provided with the horizontally-elongated eyes $i$ $i$, the rubber bush $g$, the hub H over the bush, the gear 4 on said hub, and the pin I, extending through the shaft and hub and into the eyes $i$ $i$, substantially as described and shown.

10. In a machine for flanging tin, the guide L, arranged in front of the machine, and composed of a horizontal plate, 5, carried on a level with the base of the machine, and provided with an upwardly-curved side flange, 6, substantially as described and shown.

11. In combination with the frame A and flanging-rollers journaled therein, the shaft 7, pivoted on the frame and provided with the lever 8, and the guide L, attached to the foot of said shaft, substantially as described and shown.

12. In combination with the frame A and the flanging and folding rollers journaled therein, the compressing-roller B'', journaled in the rear end of said frame at one side of the center thereof, the eccentric journal-box $k$, pivoted on the frame opposite the roller B'', the roller B''', journaled in said box, the collar $l$, attached to the box, the lever $l'$, connected with the collar, the shaft 7, pivoted on the opposite end of the frame, the lever 8, attached to the upper end of said shaft, the guide L, attached to the foot of the shaft 7, and the strap 9, connecting the lever 8 with the collar $l$, substantially as described and shown.

13. In combination with the frame A and flanging-rollers journaled therein, the guide L, arranged in front of the said rollers, and the wheel M, arranged edgewise over said guide, substantially as described and shown.

14. In combination with the frame A and flanging-rollers journaled therein, the shaft 7, and arm M', supported so as to yield vertically on the frame, the guide L, attached to the foot of the shaft 7, and the wheel M, pivoted on the arm M', substantially as described and shown.

15. In combination with the frame A and folding-rollers journaled therein, the arm N, projecting forward from the frame, and the roller pivoted on the free end of said arm, substantially as and for the purpose set forth.

16. In combination with the frame A and folding-rollers journaled therein, the arm N, hinged on the front end of the frame, a stop on said arm for limiting its movement to its forward projecting position, and the roller N', pivoted on the free end of said arm, substantially as described and shown.

17. In combination with the frame A and folding-rollers journaled therein, the arm N, hinged to swing vertically on the front end of said frame, a spring, $m$, for normally sustaining said arm in a vertical position, a stop on the arm for limiting its movement to its forward projecting position, and the roller N', pivoted on the free end of said arm, substantially as described and shown.

18. In combination with the frame A and folding-rollers journaled therein, the arm N, hinged to swing vertically on the front end of said frame, the roller N', pivoted on the free end of said arm, and the set-screw $m$ on the rear portion of the arm, to adjust said arm in its forward projecting position.

19. In combination with the frame A and flanging and folding rollers journaled therein, the vertical screw-threaded socket O, attached to said frame, the screw-threaded shaft O', extending through said socket, the collar O", attached to the foot of said shaft, the arm N, hinged on said collar, and the roller N', pivoted on the free end of said arm, substantially as described and shown.

20. In combination with the frame A and flanging and folding rollers journaled therein, the vertical screw-threaded socket O, attached to said frame, the screw-threaded shaft O', extending through said socket, the collar O", attached to the foot of said shaft, and the gage $n$, attached to said collar, substantially as described and shown.

21. In combination with the frame A and flanging and folding rollers journaled therein, the vertical screw-threaded socket O, attached to said frame, the screw-threaded shaft O', extending through said socket, the collar O", attached to the foot of said shaft, the gage $n$, projecting rearward from the collar, the arm N, hinged on the collar, and the roller N', pivoted to the free end of the arm, all combined to be adjusted simultaneously vertically toward or from the base of the machine, substantially as described and shown.

22. In combination with the frame A and flanging and folding rollers journaled therein, the vertical screw-threaded socket O, screw-threaded shaft O', extending through said socket, gage $n$, carried on the foot of said shaft, the indicator $o$, carried on said gage, and the scale $o'$, attached to the frame, substantially as described and shown.

23. In combination with the frame A and flanging-rollers journaled therein, the shaft V, locking-arm U, adjustably connected to said shaft, the arm M', clamped on the shaft, and the roller M, pivoted on the arm M', all combined to operate substantially as described and shown.

24. The rollers B" and B''', provided with circumferential grooves $e'$ $e'$, in combination with companion rollers having straight vertical sides, substantially as and for the purpose specified.

In testimony whereof I have hereunto signed my name and affixed my seal, in the presence of two attesting witnesses, at Syracuse, in the county of Onondaga, in the State of New York, this 8th day of July, 1885.

JULIUS J. COWELL. [L. S.]

Witnesses:
   C. BENDIXON,
   F. H. GIBBS.